United States Patent
Breton et al.

[11] Patent Number: 5,977,209
[45] Date of Patent: Nov. 2, 1999

[54] INK COMPOSITIONS

[75] Inventors: Marcel P. Breton, Mississauga; Patricia A. Burns, Milton; Yvan Gagnon, Mississauga; Raymond W. Wong, Mississauga; David N. MacKinnon, Mississauga, all of Canada

[73] Assignee: Xerox Corporation, Stamford, Conn.

[21] Appl. No.: 09/017,459

[22] Filed: Feb. 2, 1998

[51] Int. Cl.[6] ............................ G09D 11/00; G09D 11/02
[52] U.S. Cl. .................................. 523/160; 523/161
[58] Field of Search ......................... 523/160, 161; 106/31.27, 31.28, 31.29, 31.6, 31.61, 31.65

[56] References Cited

U.S. PATENT DOCUMENTS

| | | | |
|---|---|---|---|
| 4,251,824 | 2/1981 | Hara et al. | 346/140 R |
| 4,463,359 | 7/1984 | Ayata et al. | 346/1.1 |
| 4,532,530 | 7/1985 | Hawkins | 346/140 R |
| 4,597,794 | 7/1986 | Ohta et al. | 106/20 |
| 4,601,777 | 7/1986 | Hawkins et al. | 156/326 |
| 4,627,875 | 12/1986 | Kobayashi et al. | 106/22 |
| 4,659,383 | 4/1987 | Lin et al. | 106/27 |
| 4,705,567 | 11/1987 | Hair et al. | 106/20 |
| 4,737,190 | 4/1988 | Shimada et al. | 106/22 |
| 4,840,674 | 6/1989 | Schwarz | 106/22 |
| 4,853,036 | 8/1989 | Koike et al. | 106/20 |
| 4,877,451 | 10/1989 | Winnik et al. | 106/23 |
| 5,006,598 | 4/1991 | Adams et al. | 524/601 |
| 5,021,802 | 6/1991 | Allred | 346/1.1 |
| 5,041,162 | 8/1991 | Cooke et al. | 106/22 |
| 5,043,084 | 8/1991 | Gutierrez et al. | 252/47 |
| 5,065,167 | 11/1991 | You et al. | 346/1.1 |
| 5,108,504 | 4/1992 | Johnson et al. | 473/209 |
| 5,124,718 | 6/1992 | Koike et al. | 346/1.1 |
| 5,156,675 | 10/1992 | Breton et al. | 106/22 |
| 5,169,437 | 12/1992 | You | 106/20 D |
| 5,207,824 | 5/1993 | Moffatt et al. | 106/22 R |
| 5,324,349 | 6/1994 | Sano et al. | 106/25 R |
| 5,348,832 | 9/1994 | Sacripante et al. | 430/109 |
| 5,364,462 | 11/1994 | Crystal et al. | 106/22 R |
| 5,431,720 | 7/1995 | Nagai et al. | 106/31.43 |
| 5,503,664 | 4/1996 | Sano et al. | 524/27 |
| 5,531,818 | 7/1996 | Lin et al. | 106/31.28 |
| 5,539,038 | 7/1996 | Katsen et al. | 524/399 |
| 5,604,076 | 2/1997 | Patel et al. | 430/137 |
| 5,626,655 | 5/1997 | Pawlowski et al. | 106/31.27 |
| 5,648,193 | 7/1997 | Patel et al. | 430/137 |
| 5,658,704 | 8/1997 | Patel et al. | 430/137 |
| 5,667,569 | 9/1997 | Fujioka et al. | 106/31.58 |
| 5,679,724 | 10/1997 | Sacripante et al. | 523/161 |
| 5,684,063 | 11/1997 | Patel et al. | 523/161 |
| 5,749,952 | 5/1998 | Tsang et al. | 106/31.64 |
| 5,762,695 | 6/1998 | Wong et al. | 106/31.89 |
| 5,769,930 | 6/1998 | Sano et al. | 106/31.36 |
| 5,772,746 | 6/1998 | Sawada et al. | 106/31.86 |
| 5,837,044 | 11/1998 | Santilli et al. | 106/31.67 |
| 5,863,320 | 1/1999 | Breton et al. | 106/31.59 |

*Primary Examiner*—Vasu Jagannathan
*Assistant Examiner*—Callie E. Shosho
*Attorney, Agent, or Firm*—E. O. Palazzo

[57] ABSTRACT

An ink composition comprised of colorant, vehicle, and a salt of polyacrylic acid, a salt of polyamic acid, a salt of alginic acid, or mixtures thereof.

33 Claims, No Drawings

INK COMPOSITIONS

PENDING APPLICATIONS

The following applications, the disclosures of each being totally incorporated herein by reference, are being filed concurrently herewith.

U.S. Ser. No. 09/017,533 relating to an aqueous ink containing a dissipatible polymer, colorant and a zwitterionic component like betaine;

U.S. Ser. No. 09/017,537 relating to an ink containing a resin of a dissipatible sulfonated polyester terminated with acrylic or methacrylic acid groups;

U.S. Ser. No. 09/017,072 relating to an ink containing a mixture of two black colorants, betaine, and N,N'-bis(3-aminopropyl) ethylenediamine; and U.S. Pat. No. 5,863,320 relating to an ink containing a perfluoro surfactant additive.

The appropriate components and processes of the above applications, inclusive of the applications and patents also incorporated by reference in the above applications, may be selected for the present invention in embodiments thereof.

BACKGROUND OF THE INVENTION

The present invention is generally directed to ink compositions. More specifically, the present invention is directed to colored, especially pigmented aqueous ink compositions particularly suitable for use in ink jet printing processes, and more particularly thermal ink jet processes, and wherein image smearing is minimal, or avoided. More specifically, the inks of the present invention minimize or reduce imaging smearing without the assistance of a heating mechanism, provide for increased paper selection latitude, and the inks are substantially stable to environmental changes, such as stability to heat, freezing, and a combination thereof. In embodiments, the present invention relates to imaging processes with ink jet inks comprised of water, resin, especially dissipatible or self-emulsifying polymers, colorant and added salts of polyacrylic acid, alginic acid, acidic polyesters, and the like present in the important amounts of for example, from about 0.1 to about 20, and preferably from about 0.5 to about 10 weight percent or parts. Moreover, images developed with the inks of the present invention in embodiments enable ink jet prints of excellent resolution, acceptable density, excellent waterfastness, minimum or very low showthrough, and excellent Mid-Frequency-Line-Edge-Noise (MFLEN).

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers are useful as outputs for personal computers in the office and the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is considered a temporary phenomenon, and the ink is quickly propelled toward a print sheet. As the bubble begins to collapse, the ink still in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

Ink jet inks, and processes thereof are illustrated, for example, in U.S. Pat. Nos. 4,840,674; 5,021,802; 5,041,161; 4,853,036; 5,124,718; 5,065,167 and 5,043,084.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead, which consists of an array of ejectors and extends the full width of the print sheet, may be passed once down the print sheet to provide full-page images in what is known as a "full-width array" (FWA) printer. When the printhead and the print sheet are moved relative to each other, imagewise digital data is used to selectively activate the thermal energy generators in the printhead to permit the desired image to be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the capability of the ink to be stable with minimal or no settling, the capability of the ink to remain in a fluid condition in a printhead opening on exposure to air, and moreover wherein when the inks are selected for ink jet printing there is minimized paper curl, or wherein paper curl can be controlled.

Another important measured property for an ink jet ink is the latency or decap time, which is the length of time over which the ink remains fluid in a printhead opening or nozzle when exposed to air and, therefore is capable of firing a drop of ink at its intended target. Latency is the maximum idling times allowed for an ink to be jetted by a printer with a speed equal to or greater than 5 m/s (equivalent to an ink traveling a distance of 0.5 millimeters in less than 100 $\mu$s) without a failure. This measurement can be accomplished with the printhead or nozzles uncovered or decapped and generally at a relative humidity of about 15 percent. The time interval is the longest length of time that the printhead, uncovered, will still fire or eject a specified drop without drop displacement or loss of density. The longer the latency time rating, the more desirable the ink. The inks of the present invention possess many of these characteristics in embodiments thereof.

Moreover, an important requirement for ink jet inks, especially for colorant, especially pigment, such as carbon black, based inks, is for the pigment dispersion to remain stable throughout the life of the ink jet cartridge. Dye-based ink jet inks suffer from deficiencies in waterfastness and lightfastness after being printed on various substrates. Pigments provide an image on a wide variety of substrates, having high optical density with high waterfastness and lightfastness. Therefore, pigments are a preferred alternative to dyes, provided the pigment dispersions can be rendered stable to prevent flocculation and/or aggregation and settling. Examples of cosolvents that can be selected as clogging inhibitors cause destabilization of pigment dispersions and, therefore, are not usually effective in pigmented inks.

There is thus a need for aqueous ink compositions that can be utilized in high resolution ink jet printers. Additionally, there is a need for colorant, such as pigmented inks that provide high latency, reduced image smear, and also remain stable throughout the life of the ink jet cartridge. There is also a need for pigmented inks that provide high optical density in a single application or pass. More importantly, there is a need for ink jet inks wherein paper curl, and/or image smearing can be eliminated or minimized when such inks are selected for ink jet printing processes.

SUMMARY OF THE INVENTION

The present invention relates to an aqueous ink jet ink composition comprised of water, colorant, such as pigment particles, which particles in embodiments can possess a particle size distribution wherein at least 70 percent of the particles have a diameter below about 0.1 micron in volume average diameter as determined by known methods, such as a Coulter Counter, with the remaining particles in the dispersion having a diameter less than or equal to about 1 micron, and additives of the salts of polyacrylic acid, the salts of polyamic acid, the salts of alginic acid, or mixtures thereof. More specifically, the inks of the present are comprised of a major amount of water, colorant particles, especially carbon black, dissipatible polymers, such as sulfonated polyester, and the salts of polyacrylic acid, the salts of polyamic acid, the salts of alginic acid, or mixtures thereof. Also, the present invention relates to a high resolution printing process comprising applying the invention ink composition in imagewise fashion to a substrate. The inks in embodiments possesses a latency of at least 10 seconds in a printer having at least one nozzle of a channel width or diameter ranging from 10 to about 40 microns, and wherein the paper curl is minimized or eliminated.

Embodiments of the present invention include an ink composition comprised of colorant, vehicle, and a salt of polyacrylic acid, a salt of polyamic acid, a salt of alginic acid, or mixtures thereof; an ink composition comprised of a polymer, colorant, water, and a salt of polyacrylic acid, a salt of polyamic acid, or a salt of alginic acid; an ink wherein the salt is a sodium, potassium, lithium, or ammonium salt of polyacrylic acid, wherein the salt is a sodium, potassium, lithium, or ammonium salt of polyamic acid, or wherein the salt is a sodium, potassium, lithium, or ammonium salt of alginic acid; an ink wherein the salt is of a weight average molecular weight $M_w$ of from about 1,000 to about 100,000; an ink wherein the salt is present in an amount of from about 0.001 to about 20 weight percent; an ink wherein the salt is present in an amount of from about 0.5 to about 10 weight percent; an ink wherein the polymer is a dissipatible sulfonated polyester with a glass transition temperature of from about 0° C. to about 80° C., a softening point of from about 50° C. to about 180° C. a weight average molecular weight thereof of from about 800 to about 10,000 and wherein the polyester possesses a sulfonation level of from about 3.5 to about 20 percent; an ink wherein the polymer is selected in an amount of form about 70 to about 90 weight percent; an ink wherein the colorant is present in an amount of form about 1 to about 12 weight percent; an ink wherein the colorant is carbon black; an ink wherein the carbon black is present in an amount of form about 4 to about 12 weight percent; an ink with a viscosity of from about 1.5 to about 5 centipoise, and which ink is stable for an extended time period an ink wherein the extended time period is from about 6 months to about 18 months; an ink wherein the colorant is carbon black, and wherein the inks possess a latency of at least about 10 seconds; an ink wherein the colorant is a pigment which possesses a particle size distribution wherein at least about 90 percent of the pigment particles have a diameter of about 0.1 μm with the remaining pigment particles being of a diameter of about 1.0 μm; a high resolution printing process comprising applying in imagewise fashion to a substrate in a printer having at least one nozzle of a channel width or diameter ranging from about 10 to about 40 microns an aqueous ink jet ink composition comprised of colorant, water, polymer and an additive of a salt of polyacrylic acid, a salt of polyamic acid, or a salt of alginic acid; a process wherein the substrate is paper, and image smearing is minimized or eliminated, and wherein the printing process is optionally accomplished with a 600 spi ink jet printer; a process for reducing or eliminating image smearing in an ink jet apparatus which comprises generating images in the apparatus and developing the images with an aqueous ink jet ink composition comprised of colorant, water vehicle, polymer and a salt of polyacrylic acid, a salt of polyamic acid, or a salt of alginic acid; an ink wherein the ink further includes ink additives; an ink wherein the ink additive is a biocide, or a humectant; an ink wherein the polymer is a dissipatible polyester present in amounts of from about 0.1 to about 10 percent by weight, the colorant is present in amounts of from about 1 percent to about 10 percent by weight, the salt of polyacrylic acid and the salt of polyamic acid are each present in amounts of from about 0.5 to about 10 percent by weight, and the alginate salt is present in amounts of from about 0.001 to 0.5 percent by weight; an ink wherein the salt is a sodium salt of a polyacrylic acid with a weight average molecular weight of from about 5,000 to about 10,000; an ink wherein the vehicle is comprised of a mixture of water and a humectant, and wherein the mixture contains from about 0.1 weight percent to about 5 percent of the salt of polyacrylic acid, from about 0.1 to about 5 percent weight percent of the salt of polyamic acid, and from about 0.001 weight percent to about 0.5 weight percent of the salt of alginic acid, and wherein the humectant is present in the ink in an amount of from about 2 to about 40 percent; an ink wherein the alginate salt is present in an amount of from about about 0.001 to about 0.5 weight percent; an ink wherein the dissipatible sulfonated polyester possesses a glass transition temperature of from about 20° C. to about 65° C., a softening point of from about 70° C. to about 165° C., the weight average molecular weight thereof is from about 1,200 to about 5,000 with the ratio of the weight to number average molecular weight being about 2.0, and wherein the polyester possesses a sulfonation level, or amount of about 7.5 percent; an ink wherein the salt is of a weight average molecular weight $M_w$ of from about 1,000 to about 10,000.

Important embodiments of the present invention include an imaging process which comprises the development of an image with an aqueous ink jet ink composition comprised of colorant, such as pigment, water, and the salts of polyacrylic acid, the salts of polyamic acid, or the salts of alginic acid, present in an amount of for example, from about 2 to about 10 weight percent; an imaging process which comprises the development of an image with aqueous ink jet ink composition comprised of pigment, water, and the salts indicated herein, especially the salts of polyacrylic acid and wherein images with minimal curling and minimal smearing are obtained; a high resolution printing process comprising applying in imagewise fashion to a substrate in a printer having at least one nozzle of a channel width or diameter ranging from about 10 to about 40 microns; an aqueous ink jet ink composition comprised of polymer, colorant, like dye, or pigment, water, and the salt additives indicated herein; a process for reducing or eliminating paper curt and image smearing in an ink jet apparatus which comprises generating images in the apparatus and developing the images with an aqueous ink jet ink composition.

Imaging processes of the present invention in embodiments thereof can possess numerous advantages including excellent ink waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and minimal colorant, such as pigment settling, a lack of printhead kogation, and more importantly, wherein the inks when selected for ink jet processes enable the minimization of image smear, and wherein the inks are stable over extended time periods, for example in excess of about six months, and for example from six to about eighteen months, which stability indicates that ink settling is minimal, or is avoided.

The liquid ink vehicles include for example, water, or may comprise a mixture of water and a miscible organic component, such as a glycol, like ethylene glycol, propylene glycol, diethylene glycols, glycerine, dipropylene glycols, polyethylene glycols, polypropylene glycols, and the like; amides, ethers, carboxylic acids, esters, alcohols, organosulfides, organosulfoxides, sulfones, dimethyl sulfoxide, sulfolane, alcohol derivatives, carbitol, butyl carbitol, cellusolve, ether derivatives, amino alcohols, ketones, and other water miscible materials, and mixtures thereof. The liquid vehicle is generally present in an amount of for example, from about 50 to about 99.5 percent by weight, or parts, preferably from about 55 to about 95 percent by weight, and more preferably from about 60 to about 90 percent by weight, although the amount can be outside these ranges. Weight percent refers to the amount of component calculated by known methods, such as by dividing the amount of the reference component by the total of all ink components and multiplying by 100. The total amount of components is equal to about 100 percent.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The nonwater component of the liquid vehicle generally serves as a humectant which has a boiling point higher than that of water (100° C.). The colorant dispersion can be mixed with different humectants or solvents including glycols, like ethylene glycol, diethylene glycol, propylene glycol, dipropylene glycol, polyethylene glycols, polypropylene glycols, glycerine, and the like; trimethylolpropane, 1,5-pentanediols, 1,6-hexanediols, diols and triols containing 2 to 10 carbons, sulfoxides, for example dimethyl sulfoxide, alkylphenyl sulfoxides or sulfones like sulfolane, dialkyl sulfones, alkyl phenyl sulfones, and the like, amides, for example N,N-dialkyl amides, N,N-alkyl phenyl amides, 3-methyl-2-oxazolidinone, isosorbide dimethyl ether, N-methylpyrrolidinone, N-cyclohexylpyrrollidinone, N,N-diethyl-m-toluamide, and the like, ethers such as alkyl ether derivatives of alcohol, etherdiols, and ethertriols including butyl carbitol, alkyl polyethylene glycols, and the like, urea, betaine, or the thio (sulfur) derivatives of the aforementioned materials, for example, thioethylene glycol, trithioethylene glycol, and the like. The humectants or solvents are present in various suitable amounts such as for example, from about 0.1 to about 50 percent by weight and preferably from about 5.0 to 40 percent by weight. Known desired penetrants, water soluble polymers, pH buffer, biocides, chelating agents (EDTA and the like), and optional additives can also be used.

Examples of the additive salts, which salts were obtained from Aldrich Chemicals include the salts of polyacrylic acid, polyamic acid, alginic acid, or mixtures thereof, with the preferred salts being the salts of polyacrylic acid of weight average molecular weight of less than about, or equal to about 20,000 and preferably less than about 10,000, and more specifically from about 1,000 to about 10,000. The alginic acid salts are commercially available in different viscosity ranges, with the low viscosity alginate salts being the preferred additives for the present invention. The alginic acid is preferably used at concentration between about 0.001 and 0.1 percent in the ink, it is composed of two mostly alternating segments of polymannuronic acid and polyguluronic acid. The salts may be present in the inks of the present invention in any effective amounts, and for example, preferably less than about 10 percent by weight in the ink, and more preferably less than about 5 percent by weight. Specifically the salt additive is present in the ink in amounts of form about 1 to about 5 weight percent, or parts. Examples of preferred salts are the sodium, potassium, lithium or, ammonium salts of polyacrylic acid, polyamic acid and alginic acid. The propylene glycol ester of alginic acid can also be selected for the inks of the present invention. Also suitable for the inks of the present invention are amine alginates prepared by reacting alginic acid with organic amines such as triethanolamine, triisopropanolamine, butylamine, dibutylamine, or diamylamine.

The colorant for the ink compositions of the present invention includes a dye, pigment, mixtures of dyes and pigment, mixtures of pigments, mixtures of dyes, and the like. The colorant can be black, cyan, magenta, yellow, red, blue, green, brown, mixtures thereof, and the like, and is preferably the carbon black Levanyl carbon black obtained from Bayer. Examples of suitable black pigments include various carbon blacks such as channel black, furnace black, lamp black, and the like. Colored pigments include red, green, blue, brown, magenta, cyan, yellow, and mixtures thereof. Illustrative examples of magenta pigments include 2,9-dimethyl-substituted quinacridone and anthraquinone, identified in the Color Index as Cl 60710, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3'-dichlorobenzidine acetoacetanilides, a monoazo pigment identified in the Color Index as Cl 12700, Cl Solvent Yellow 16, a nitrophenol amine sulfonamide identified in the Color Index as Foron Yellow SEIGLN, Cl Dispersed Yellow 33, 2,5-dimethoxy4-sulfonanilide phenylazo4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot CSC440L and Levanyl Black A-SF. Of these, Levanyl Black A-SF and Cabot CSX-440L are the most preferred. Examples of suitable colorants, like pigments that may be selected in embodiments are illustrated in U.S. Pat. No. 5,556,727, the disclosure of which is totally incorporated herein by reference.

Preferably, the colorant, which can inlcude pigments, dyes, mixtures thereof, mixtures of dyes, mixtures of pigments, and the like, particle size is small to enable for example, a stable colloidal suspension of the particles in the liquid vehicle and to prevent clogging of the ink channels when the ink is used in a thermal ink jet printer. Preferred pigment particle average diameters are generally from about 0.001 to about 2 microns, and more preferably from about 0.01 to about 1 micron in volume average diameter, although the particle size can be outside these ranges. A more preferred colorant, especially particle size includes particles with at least 70 percent of the particles being below 0.1 micron with no particles being greater than 1.0 micron (measured on a Hodaka CAPA 700 Particle Size Analyzer). More preferably, the colorant, especially pigment particle size includes particles having at least 90 percent of the particles being below 0.1 micron with no particles being greater than about 1.0 micron.

The colorant is present in the ink composition in various effective amounts and generally for example from about 1 to about 20 percent by weight, preferably from about 3 to about 10 percent by weight, more preferably from about 4 to about 9 percent by weight, and most preferably from about 4 to about 8 percent, although the amount can be outside of these ranges.

Examples of suitable dyes that may be added to the inks of the present invention include reactive dyes, direct dyes, anionic dyes, acid dyes, food dyes, and the like. Specific examples of suitable dyes include mixtures of the ProJet dyes available from Zeneca (ICI) such as ProJet Fast Magenta 2, ProJet Fast Black 2, ProJet Fast Yellow 2, ProJet Fast Cyan 2, and ProJet Fast Black 2-CF1 with less waterfast dyes such as ProJet Yellow 1G, ProJet Yellow OAM, ProJet Cyan 1, ProJet Magenta 3B-OA, ProJet Magenta 1T, ProJet Magenta 1, and ProJet Black OA-PZ. Other dyes are also suitable for the embodiments of this invention: Basacid Black X-34, available from BASF, Carta Black 2GT, available from Sandoz Inc., Duasyn Acid Blue AE-SF, available from Hoechst, Duasyn Direct Turquoise Blue FRL-SF available from Hoechst, Duasyn Yellow R-GL, available from Hoechst, Bayscript Yellow GGN, available from Bayer, Pontamine Brillant Flavine 6G-N, available from Bayer, Bayscript Magenta WDP, available from Bayer, Duasyn Acid Rhodamine B-SF, available from Hoechst, Bayscript Yellow BR, available from Bayer, Bayscript Cyan BA Liquid, available from Bayer, Special Black HF Liquid, available from Bayer, Special Yellow CA51089FW, available from Bayer, Acid Yellow 17, available from Tricon, and the like.

Polymeric additives can also be included in the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidone, polyvinyl ether, starch, polysaccharides, polyethylene imines derivatized with polyethylene oxide and polypropylene oxide, such as the DISCOLE® series available from DKS International, Tokyo, Japan, the JEFFAMINE® series available from Texaco, Bellaire, Tex., and the like. These additives may be present in the ink of the present invention in various suitable amounts of for example, from 0 to about 10 percent by weight, preferably from about 0.001 to about 8 percent by weight, and more preferably from about 0.01 to about 5 percent by weight, although the amount can be outside these ranges. Preferred polymeric additives are described in copending application U.S. Ser. No. 536,236, the disclosure of which is totally incorporated herein by reference, which additives are especially useful as pigment like carbon black stabilizers.

Polymer examples include the the self-emulsifying sulfonated polyesters disclosed in U.S. Ser. No. 536,236, the disclosure of which is totally incorproated herein by reference, and these polymers and related polymers can be selected in various appropriate amounts and preferably in amounts of from about 0.1 weight percent to about 12 weight percent and more preferably from about 1 weight percent to about 8 weight percent. The preferred polyesters such as copoly(1,2-propylene-diethylene) terephthalate-copoly(sodium sulfoisophthalate dicarboxylate) possess a glass transition temperature ranging from about 0° to about 80° C. and preferably between about 20° C. and about 65° C., a softening point ranging from about 50° C. to about 180° C. and preferably between 70° C. and 165° C., a weight average ranging from about 800 to about 10,000 and preferably from about 1,200 to about 5,000. The ratio of the weight to number average molecular weight being about 2.0. One selected polyester is a sulfonated polyester with about 7.5 percent sulfonation, weight average molecular weight of about 2,080, $M_n$ of about 1,043, Tg of about 54.9° C., and softening point of about 135° C. Preferred are a combination of a self-emulsifying sulfonated polyester with a polyacrylate salt in which the ratio of the polyester to the polyacrylate one is between 20 and 0.4 and preferably between 4 and 1.5.

Examples of specific optional ink additives that may be selected include biocides, such as DOWICIL® 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives, such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of for example, from 0 to about 50 percent by weight, and preferably from about 1 to about 30 percent by weight, although the amount can be outside these ranges, pH controlling agents, such as acids or bases, phosphate salts, carboxylates salts, sulfite salts, amine salts, and the like, each present in an amount of for example, from 0 to about 1 percent by weight, preferably from about 0.001 to about 1 percent by weight, and more preferably from about 0.01 to about 1 percent by weight, although the amount can be outside these ranges, or the like.

Other examples of suitable ink additives include those illustrated in U.S. Pat. No. 5,223,026 and U.S. Pat. No. 5,207,825, the disclosures of each of which are totally incorporated herein by reference.

The inks can be prepared by simply mixing the ink components and optional additives when selected. The mixing can be accomplished by various methods including homogenizing, sonification, microfluidization, mechanical mixing, magnetic stirring, high speed jetting, and the like. The sonification process is preferred since such a process provides a homogeneous dispersion by evenly distributing the dispersant throughout the pigment dispersion.

The dispersed colorant, like pigment can be used as an ink as is, and preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter should be of a size to remove particles greater than 3 $\mu$m in size diameter, preferably greater than 1.2 $\mu$m in size, and most preferably greater than 1 $\mu$m, for example from about 1 to about 3 microns in size. Any suitable filtration method, such as continuous and/or batch filtration methods, may be used. Continuous filtration methods are preferred for large scale production of pigment inks. Inks which have been centrifuged and filtered so as to preferably remove particles greater than 1 $\mu$m in size from the ink are suitable for use as ink jet inks because of their ability to not clog the ink jet, and their long latency and jetting stability.

The surface tension of the colorant, such as the pigment dispersions are, for example, greater than about 30 dynes/cm$^2$, preferably greater than about 45 dynes/cm$^2$, and more preferably greater than about 60 dynes/cm$^2$. Ink compositions according to the present invention more specifically possess surface tensions greater than about 25 dynes/cm$^2$, preferably greater than about 45 dynes/cm$^2$ and more preferably greater than about 50, such as from about 50 to about 100, dynes/cm$^2$. The viscosity of the ink composition is for example, less than about 10.0 cps, preferably less than about 8.0 cps, and more preferably less than about 5.0 cps, such as from about 1 to about 5 cps.

Surfactants can be added to the inks of the present invention. Examples of surfactants that can be selected for the inks of the present invention are for example, sodium alkyl sulfate and sodium alkoxyl sulfate such as sodium lauryl sulfate and N-lauroylsarcosine. Other examples of surfactants include alcohol surfactants and more specifically a mixture of secondary alcohols reacted with ethylene oxide in which the secondary alcohols contain for example between about 11 and about 15 carbons, and wherein the secondary alcohol based surfactant is of the Tergitol 15-S series surfactants available from Union Carbide. Examples of secondary alcohol surfactants include those of the general formula $C_{11\text{-}15}$ $H_{23\text{-}31}$ $O[CH_2CH_2O]_xH$, wherein x represents a suitable number and which surfactants include: 1) Tergitol 15-S40 surfactant with a degree of ethoxylation (mole/mole, avg) of 41.1, a calculated HLB value of 18.0 and a molecular weight in the range of about 1,800–2,100; 2) Tergitol 15-S-30 surfactant with a degree of ethoxylation (mole/mole, avg) of 31.0, a calculated HLB value of 17.5 and a molecular weight in the range of about 1,440–1,640; 3) Tergitol 15-S-20 surfactant with a degree of ethoxylation (mole/mole, avg) of 20.1, a calculated HLB value of 16.4 and a molecular weight in the range of about 1,020–1,150; 4) the Tergitol 15-S-15 surfactant with a degree of ethoxylation (mole/mole, avg) of 15.5, a calculated HLB value of 15.6 and a molecular weight in the range of about 850–920; 5) Tergitol 15-S-9 surfactant with a degree of ethoxylation (mole/mole, avg) of 8.9, a calculated HLB value of 13.3 and a calculated molecular weight in the range of about 584. These surfactants have excellent solubility in water and their cloud point (1% solution) is for example above about 60 degrees Centigrade. With cosolvents such as sulfolane, thiodiglycol, and the like, the cosolvents can be selected in concentrations, or amounts ranging from about 0.001 to about 10.0 weight percent and preferably about 0.0056, 0.018, 0.028, 0.071 and 0.22 weight percent to about 8 weight percent of surfactant such as Tergitol 15-S-9, 15-S-15, 15-S-20, 15-S-30, 15-S-40 respectively. The lower effective concentrations correspond to the critical micelle concentrations of the selected surfactants. The surfactants of the present invention are preferably used in the absence of conventional penetrants such as butyl carbytol, cyclohexylpyrrolidinone, and low molecular weight alcohols such as methanol, ethanol, propanol, butanol and isopropanol for optimum print quality, that is excellent optical density, edge raggedness at drytime of less than about 10 seconds. Other Tergitol surfactants can also be selected in combination with the aforementioned surfactants, such as for example Tergitol 15-S-3, HLB=8.3; 15-S-5, HLB=10.6; and 15-S-7, HLB=12.4. The weight percent of each surfactant in the mixture is selected so as to satisfy two conditions: 1) HLB effectiveness:weight percent of surfactant A times the HLB of surfactant A+ weight percent of surfactant B times the HLB of surfactant B>13; 2) the surfactant mixture is to remain soluble in the ink up to a temperature of 60 degrees Centigrade.

The inks may also include polyhydroxy alcohol surfactants such as the PEG 1540 monolaurate, the PEG 1000 monoricinoleate, the PEG 75 lanolin alcohol ether, the PEG 6000 monooleate, the PEG 200 castor oil (also available under the name Mapeg CO-200, PPG/Speciality Chem.) and more specifically the Surfynol 485, a PEG-30 tetramethyl decynediol available from Air Products and Chem., and Solan E, a polyethylene glycol (75) lanolin available from Croda, Parsippany and which surfactants are present in the important amounts indicated herein, such as from 2 to about 7 weight percent or parts based on the total ink components. The PEG 1540 monolaurate has a HLB value of about 17; the PEG 1000 monoricinoleate, a value of 17.5; the PEG 75 lanolin alcohol ether, a value of about 16; the PEG 6000 monooleate, a value of 19; the PEG 200 castor oil, a value of 18.1; the Surfynol 485, a value of 17; and the Solan E, a value of 15. Other commercial surfactants are also suitable. These are for example the Atlas G-1288 (ICI Surf. Belgium), a PEG triglyceride with an HLB value of 16.0; the Atlas G-1295 (ICI Surf. Belgium), a PEG triglyceride with an HLB value of 17.5; the Atlas G-1649 (ICI Am.), a PEG alkyl aryl ether with an HLB value of 16.0; the Altas G-2151 (ICI Am.), a PEG-30 stearate with an HLB value of 16.0; the Atlas G-2162 (ICI Am.), a PEG-25 propylene glycol stearate with an HLB value of 16.0; the Atlas G-3780A (ICI Am.), a PEG-20 tallow amine with an HLB value of 15.5; the Renex 720 (ICI Am.), a PEG-20 syn. primary C13-15 alcohol with an HLB value of 16.2; the Mapeg 1000 MS (PPG/Speciality Chem.), a PEG-20 stearate with HLB value of 15.7; the Nissan Nonion DS-60HN (Nippon Oils & Fats), a PEG distearate of HLB value of 19.0; the Nissan Nonion E-230, a PEG oleyl ether with an HLB value of 16.6; the Nissan Nonion HS-220 (Nippon Oils & Fats), a PEG octyl phenol ether with an HLB value of 16.2; the Nissan Nonion HS-240 (Nippon Oils & Fats), a PEG-40 octyl phenol ether with an HLB value of 17.9; the Nissan Nonion HS-270 (Nippon Oils & Fats), a PEG-70 octyl phenol ether with an HLB value of 18.7.

The inks of the present invention possess excellent latency. Generally, the inks possess a functional latency of at least about 10 seconds, more generally from about 20 seconds to greater than about 1,000 seconds, with a minimum latency of at least about 30 seconds being preferred.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like. Preferably the paper is indicated in the Examples that follow.

In the Examples that follow the carbon black selected for the inks was Levanyl carbon black obtained from Bayer.

EXAMPLE I

Step 1—Preparation of Self-emulsifying Sulfonated Polyester

A self-emulsifying sulfonated polyester, a copoly(1,2-propylene-diethylene)terephthalate-copoly(sodium sulfoisophthalate dicarboxylate), was prepared by a polycondensation process. The polycondensation reactions were accomplished in a modified 5 gallon 4555 Parr Pressure reactor equipped with ½ Hp (1750 rpm) variable speed stirrer motor, a Watlow Series 945 temperature/stirrer controller and a 3 zone ceramic heater unit. A 24 inch Liebeg glass condenser with a 1 liter round bottom catch flask was fitted to a 24.29 steel joint welded to the top plate of the reactor. Glass transitions (Tg) of approximately 10 to 30 milligrams of the polymer were measured on an E. I. DuPont DSC 10 Differential Scanning Calorimeter and the DSC thermograms processed using software supplied with DuPont Thermal Analyst 2200 computer. Softening points (Ts) were measured using a FP83 Dropping Point heater and processed using a Mettler PP80 processor.

The reactor was charged with 3.492 kilos (17.64 moles, Hoechst Celanese) of dimethyl terephthalate and 0.9405 kilos of dimethyl 5-sulfoisophthalate (3.175 moles, DuPont), 2.901 kilos of propylene glycol (38.12 moles, APCO Industries Company Ltd.), 0.449 kilos of diethylene glycol (4.23 moles, APCO Industries Company Ltd.) and 7.2 grams of the transesterification catalyst, Fascat (Elf Atochem). The initial set temperature of the reactor was 90° C., the temperature was increased slowly to 150° C. over a period of 3 hours. Slow stirring (speed 0.43) of the melt was initiated and the reaction temperature increased to 200° C. over a 4 hour period to allow for transesterification. Methanol distillate was first observed at 157° C., and continued until approximately 1,500 milliliters were recovered. An additional 560 milliliters of excess glycols were removed and trapped in a dry ice trap by increasing the temperature slowly to 210° C. and submitting the mixture to a vacuum of about 260 millimeters/Hg. An Edwards Vacuum pump was then attached and the vacuum slowly decreased to 1 millimeter/Hg to remove an additional 337 milliliters of glycols. Vacuum and heat were continued for an additional two hours at the same temperature and a final hour at 215° C. The reactor was then discharged. The copoly(1,2-propylene-diethylene)terephthalate-copoly(sodium sulfoisophthalate dicarboxylate) product produced was found to have a glass transition temperature of 54.9° C. (measured with an E. I. Dupont DSC operating at 10 degree C. per minute), and a $M_w$ was 2,080 as measured on a Waters Gel Permeation Chromatography system using tetrahydrofuran as the solvent, and the softening point of the copolymer was 135.1° C. This resin was used to prepare stable dispersions of Levanyl (available from Bayer) carbon black.

Step 2—Preparation of Aqueous Solution from Polymer Obtained in Step 1

An aqueous polyester solution was prepared by slowly adding 10.15 grams of the sulfonated polyester polymer obtained in Step 1 to 118.6 grams of deionized water retained at a temperature of about 80° C. The resulting polymer solution was then heated and stirred with a stirring bar at this temperature 80° C. until the polymer was completely dissolved and the solution appears clear, and for an additional 10 minutes thereafter. The solution is then permitted to cool down to room temperature, about 25° C., while continuing the agitation.

Step 3—Preparation of Carbon Black Dispersion from Solution Obtained in Step 2

A carbon black dispersion was prepared by adding 91.23 grams of Levanyl A-SF dispersion available from Bayer (carbon black content of 31.8 percent) to the solution obtained from Step 2. Additional deionized water was added to the mixture to obtain 210 grams of the Levanyl/polyester dispersion. The dispersion was then mixed further for a period of 15 minutes.

Step 4—Microfluidization of Dispersion Solutions Prepared in Step 3

A modified microfluidizer, model M110F, specially modified with compressed air cooling through an isolator and cooling bath externally mounted around the intensifier pump, was used to further process the carbon black dispersion obtained in Step 3. The dispersion obtained in Step 3 was processed at 11,500 psi. The processing temperature, 80° C., was reached within 5 to 10 minutes with the assistance of an electrical heater attached to the inlet vessel of the microfluidizer. The microfluidizer was operated for an additional 15 minutes while maintaining the temperature of the intensifier cooling bath at a temperature of about minus 10° C. This was achieved by circulating compressed air (30 psi) through the isolator cooling line and by maintaining the externally mounted cooling bath filled with dry ice and isopropyl alcohol. The microfluidizer was then shut off and the resulting carbon black dispersion was discharged from the microfluidizer vessel.

Step 5—Preparation of Carbon Black Inks Containing 30% By Weight of Polymer Prepared in Steps Above The carbon black inks of Table 1 (pigment to polymer ratio being 10 to 3) were prepared in amounts of 30 grams by adding the required proportions of the microfluidized dispersion obtained in Step 4, for example 16.04 grams for a 7 percent by weight carbon black in the ink, to water, 4.96 grams or less, adjusted for the amount of salt used in the ink. After five minutes of agitation, 9.00 grams of the sulfolane were added to the mixture. After another five minutes of agitation, 0.125 gram of cyclohexylpyrrolidinone was added and finally, five minutes later, the selected salt was added in the amount indicated in Table 1. The resulting inks were stirred for about 3 hours at room temperature, permitted to stand for a period of 18 hours, and then filtered through a one micron glass fiber filter. The resulting inks contained 30 percent by weight of the above self-emulsifying sulfonated polyester based on the amount of carbon black (10:3, Table 1). The compositions for Examples 2, 9, 10, 11, and 12 respectively were 7 percent by weight of Levanyl carbon black, 2.1% by weight of the copoly(1,2-propylene-diethylene)terephthalate-copoly(sodium sulfoisophthalate dicarboxylate) prepared above, 30 percent by weight fo sulfolane, 0.42 percent by weight of cyclohexylpyrrolidinone and 0% additive (Example 2), 1.0 percent by weight of PAA (Example 9), 1.0 percent by weight of PAA (Example 10), 1.0 percent by weight of Na salt of PAA (Example 11), 1.0 percent by weight of Na salt of PAA (Example 12). The pH of the inks were adjusted with a 1N NaOH solution when necessary and as indicated in Table 1.

EXAMPLES 1 and 3 to 8

Control

Preparation of Carbon Black Inks Without Self-Emulsifying Polymers

Examples 1 and 3 to 8 of Table 1 were prepared with the Levanyl A-SF carbon black dispersion without the use of a self-emulsifying polymer and no salt. In these Examples, the amount of Levanyl A-SF dispersion used to prepare the ink was 6.025 g for a 7 percent by weight carbon black ink. The compositions for Examples 1, 3, 4, 5, 6, 7, and 8 respectively were 7 percent by weight of Levanyl carbon black, 30 percent by weight to sulfolane, 0.42 percent by weight of cyclohexylpyrrolidinone and 0% additive (Example 1), 0.5 percent by weight of PAA (Example 3), 1.0 percent by weight of PAA (Examples 4, 5, 8), 2.0 percent by weight of PAA (Examples 6,7). Samples 5 and 8 also contain 0.1 percent by weight of N-lauroylsarcosine. The pH was adjusted with a 1N NaOH solution as indicated in Table 1.

Print Quality

All the inks were printed on an HP 850C printer by replacing the HP carbon black inks by the inks of Table 1. Test prints were generated on the Xerox Image Series LX paper, a basic paper (7NT in Table 1) and on Xerox 4024DP paper, an (18NT, an acidic paper, in Table 1). The smear data was obtained by rubbing under pressure the wire side of the selected paper against the felt side of the same paper. On the felt side was printed a black image (1.25 inch square). The optical density of the smeared image (wire side paper) was obtained from a Macbeth TR927 density meter. Under these testing conditions, the HP 850C black print had a smear OD value of about 0.30 on both of the above papers. The smear and optical density data for the inks prepared with the additive salts of the present invention are provided in Table 1.

The data provided evidence the advantages of using the combination of a self-emulsifying polyester with the additive salts of the present invention for reducing smear.

With respect to smear control, it was found that with the invention inks with the additive salts, reduced smear from values of about 0.8 OD to less than 0.1 OD. The optical density of the prints remained acceptable at values greater than about 1.1. For ink samples 3 to 8 in Table 1, there is a significant reduction of smear associated with the presence of a 5,000 $M_w$ (weight average molecular weight) poly(acrylic acid), especially on a basic paper such as Image Series LX. The data obtained for ink samples 7 and 8 printed on an acidic paper, Xerox 4024DP, clearly demonstrate the advantages of using neutral or basic inks for a maximum reduction of the smear with the inks of the present invention. When both the poly(acrylic acid) or poly(acrylic acid) salt and the self-emulsifying polyester stabilizer are used in the inks of the present invention, the smear was found to be lower than when the self-emulsifying polyester was used alone or the polyacrylic acid salts were used alone.

TABLE 1

Effect of Self-Emulsifying Polyester and PAA on Smear of Carbon Black Inks

| Ink # | Pigment: Polymer | Type of Additive | pH | Additive Weight % | OD 7NT | OD 18NT | Smear 7NT | Smear 18NT |
|---|---|---|---|---|---|---|---|---|
| Control Samples. No additive, with/without self-emulsifying polyester |
| 1 | 10:0 | None | — | N/A | 1.33 | 1.29 | 0.88 | 0.88 |
| 2 | 10:3 | None | — | N/A | 1.37 | 1.26 | 0.90 | 0.78 |
| Effect of PAA |
| 3 | 10:0 | PAA, 5,000 $M_w$ | 4.5 | 0.5 | 1.37 | 1.41 | 0.48 | — |
| 4 | 10:0 | PAA, 5,000 $M_w$ | 4.2 | 1.0 | 1.31 | 1.39 | 0.30 | — |
| 5 | 10:0 | PAA, 5000 $M_w$ | 4.2 | $1.0^1$ | 1.29 | 1.32 | 0.24 | 0.78 |
| 6 | 10:0 | PAA, 5000 $M_w$ | 3.8 | 2.0 | 1.24 | 1.35 | 0.22 | 0.87 |
| 7 | 10:0 | PAA, 5000 $M_w$ | $12.0^2$ | 2.0 | 1.26 | 1.22 | 0.32 | 0.09 |
| 8 | 10:0 | PAA, 5000 $M_w$ | $7.0^2$ | $1.0^1$ | 1.25 | 1.18 | 0.37 | 0.17 |
| 9 | 10:3 | PAA, 5000 $M_w$ | 4.0 | 1.0 | 1.02 | 1.21 | 0.06 | 0.73 |
| 10 | 10:3 | PAA, 5000 $M_w$ | $7.5^2$ | 1.0 | 1.06 | 1.21 | 0.09 | 0.65 |
| Effect of Na salt of PAA |
| 11 | 10:3 | Na salt of PAA, 2,100 $M_w$ | 5.0 | 1.0 | 1.13 | 1.23 | 0.16 | 0.73 |
| 12 | 10:3 | Na salt of PAA, 6,000 $M_w$ | 5.0 | 1.0 | 1.10 | 1.25 | 0.07 | 0.69 |

[1]Contains 0.1% N-lauroylsarcosine surfactant.
[2]pH adjusted with 1N NaOH from acidic to neutral or basic.
The polyacrylic acid and its salts were obtained from a commercial source, e.g. Scientific Polymer Products, Inc.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of colorant, vehicle, dissipatible polymer and a compound selected from the group consisting of a salt of polyacrylic acid, a salt of polyamic acid, a salt of alginic acid, and mixtures thereof.

2. An ink in accordance with claim 1 wherein said vehicle is comprised of a mixture of water and a humectant, and wherein the mixture contains from about 0.1 weight percent to about 5 percent of the salt of polyacrylic acid, from about 0.1 to about 5 percent weight percent of the salt of polyamic acid, and from about 0.001 weight percent to about 0.5 weight percent of the salt of alginic acid, and wherein said humectant is present in the ink in an amount of from about 2 to about 40 percent.

3. An ink in accordance with claim 1 wherein said alginate salt is present in an amount of from about about 0.001 to about 0.5 weight percent.

4. An ink composition comprised of a dissipatible polymer, colorant, water, and a compound selected from the group consisting of a salt of polyacrylic acid, a salt of polyamic acid, and a salt of alginic acid.

5. An ink in accordance with claim 4 wherein the salt is a sodium, potassium, lithium, or ammonium salt of polyacrylic acid, wherein the salt is a sodium, potassium, lithium, or ammonium salt of polyamic acid, or wherein the salt is a sodium, potassium, lithium, or ammonium salt of alginic acid.

6. An ink in accordance with claim 4 wherein the salt is of a weight average molecular weight $M_w$ of from about 1,000 to about 100,000.

7. An ink in accordance with claim 4 wherein said salt is present in an amount of from about 0.001 to about 20 weight percent.

8. An ink in accordance with claim 4 wherein said salt is present in an amount of from about 0.5 to about 10 weight percent.

9. An ink in accordance with claim 4 wherein said polymer is a dissipatible sulfonated polyester with a glass transition temperature of from about 0° to about 80° C., a softening point of from about 50° C. to about 180° C. a weight average molecular weight thereof of from about 800 to about 10,000 and wherein said polyester possesses a sulfonation level of from about 3.5 to about 20 percent.

10. An ink in accordance with claim 9 wherein the dissipatible sulfonated polyester possesses a glass transition temperature of from about 20° C. to about 65° C., a softening point of from about 70° C. to about 165° C., the weight average molecular weight thereof is from about 1,200 to about 5,000 with the ratio of the weight to number average molecular weight being about 2.0, and wherein said polyester possesses a sulfonation level, or amount of about 7.5 percent.

11. An ink in accordance with claim 4 wherein the polymer is selected in an amount of form about 70 to about 90 weight percent.

12. An ink in accordance with claim 4 wherein the colorant is present in an amount of form about 1 to about 12 weight percent.

13. An ink in accordance with claim 4 wherein the colorant is carbon black.

14. An ink in accordance with claim 13 wherein the carbon black is present in an amount of form about 4 to about 12 weight percent.

15. An ink in accordance with claim 4 with a viscosity of from about 1.5 to about 5 centipoise, and which ink is stable for an extended time period.

16. An ink in accordance with claim 15 wherein said extended time period is from about 6 months to about 18 months.

17. An ink in accordance with claim 4 wherein said colorant is carbon black, and wherein said inks possess a latency of at least about 10 seconds.

18. An ink in accordance with claim 4 wherein said colorant is a pigment which possesses a particle size distribution wherein at least about 90 percent of said pigment particles have a diameter of about 0.1 $\mu$m with the remaining pigment particles being of a diameter of about 1.0 $\mu$m.

19. An ink in accordance with claim 4 wherein said ink further includes ink additives.

20. An ink in accordance with claim 19 wherein the ink additive is a biocide, or a humectant.

21. An ink in accordance with claim 4 wherein said polymer is a dissipatible polyester present in amounts of from about 70 to about 90 percent by weight, the colorant is present in amounts of from about 1 percent to about 10 percent by weight, the salt of polyacrylic acid and the salt of polyamic acid are each present in amounts of from about 0.5 to about 10 percent by weight, and the alginate salt is present in amounts of from about 0.001 to 0.5 percent by weight.

22. An ink in accordance with claim 4 wherein said salt is a sodium salt of a polyacrylic acid with a weight average molecular weight of from about 5,000 to about 10,000.

23. An ink in accordance with claim 4 wherein the salt is of a weight average molecular weight $M_w$ of from about 1,000 to about 10,000.

24. A high resolution printing process comprising applying in imagewise fashion to a substrate in a printer having at least one nozzle of a channel width or diameter ranging from about 10 to about 40 microns an aqueous ink jet ink composition comprised of colorant, water, dissipated polymer and an additive selected from the group consisting of a salt of polyacrylic acid, a salt of polyamic acid, and a salt of alginic acid.

25. A process in accordance with claim 24 wherein the substrate is paper, and image smearing is minimized or eliminated, and wherein said printing process is optionally accomplished with a 600 spi ink jet printer.

26. A process for reducing or eliminating image smearing in an ink jet apparatus which comprises generating images in said apparatus and developing said images with an aqueous ink jet ink composition comprised of colorant, water vehicle, dissipated polymer and a compound selected from the group consisting of a salt of polyacrylic acid, a salt of polyamic acid, and a salt of alginic acid.

27. An ink composition comprised of colorant, vehicle, a dissipatible polymer, and a compound selected from the group consisting of a salt of polyacrylic acid, and a salt of polyamic acid, a salt of alginic acid.

28. An ink composition in accordance with claim 27 wherein said polymer is a polyester.

29. An ink composition in accordance with claim 28 wherein said polymer is a sulfonated polyester.

30. An ink composition in accordance with claim 27 wherein said salt is a salt of polyacrylic acid.

31. An ink composition in accordance with claim 27 wherein salt is a sodium, potassium or ammonium salt.

32. An ink composition consisting essentially of a dissipatible polymer, colorant, water, and a compound selected from the group consisting of a salt of polyacrylic acid, a salt of polyamic acid and a salt of alginic acid.

33. A high resolution printing process comprising applying in imagewise fashion to a substrate in a printer having at least one nozzle of a channel width or diameter ranging from about 10 to about 40 microns an aqueous ink jet composition comprised of colorant, vehicle, dissipatible polymer and an additive selected from the group consisting of a salt of polyacrylic acid, a salt of polyamic acid, and a salt of alginic acid.

\* \* \* \* \*